WATER-IN-OIL EMULSIONS

Walter J. Coppock, Wallingford, and Seymour W. Ferris, Chester, Pa., assignors to Sun Oil Company, Philadelphia, Pa., a corporation of New Jersey
No Drawing. Filed July 8, 1959, Ser. No. 825,644
6 Claims. (Cl. 252—32.7)

This invention relates to emulsions of water in petroleum lubricating oil, suitable for use as fire resistant hydraulic fluids and for other purposes.

Important characteristics of such emulsions in various uses include their stability and their characteristics with respect to avoiding frictional wear of metal parts. Prior art emulsions have not been entirely satisfactory with respect to these characteristics, and prior to the present invention, the art had not recognized any manner in which these unsatisfactory characteristics could be overcome.

With respect to the wear resisting characteristics of emulsion fluids, the performance of the aqueous phase has surprisingly been found to be a significant factor even though that phase is dispersed in the continuous hydrocarbon phase. The performance of the latter phase is also a significant factor in the performance of the emulsion as a whole.

The present invention provides novel compositions comprising emulsions of water in hydrocarbon oil which exhibit superior characteristics, with respect to wear resistance and other features, to those of prior art compositions. These superior characteristics are obtained by the incorporation of certain additive materials in the aqueous phase, the hydrocarbon phase or both.

In one embodiment, the invention involves the provision of an aqueous phase which has kinematic viscosity of at least 1 centistoke, and preferably at least 1.5 centistokes, at 100° F. A water-soluble thickener is employed to increase the viscosity of the aqueous phase from that of water, which is about 0.7 centistoke at 100° F.

It is known in the art to use thickeners in non-emulsion aqueous lubricants in order to obtain lubricating viscosity, but the art has apparently not recognized any need for such thickeners in emulsion fluids as contemplated here where sufficiently high viscosity of the total emulsion for the intended use is obtained readily without the thickener.

Any suitable known thickener for the aqueous phase can be employed. Suitable thickeners include those materials which are soluble in water in sufficient amount to provide the necessary viscosity of the aqueous phase, and which do not have adverse effect on emulsion stability. Provision of aqueous phase viscosity in excess of 10 cs. at 100° F. is usually undesirable, because it does not result in any significant reduction in wear below that obtained at lower viscosities.

Preferred thickeners are the water-soluble polymerization products of alkylene oxides, which products have molecular weight of at least 10,000 and more preferably of at least 100,000. Polymers and copolymers of ethylene oxide, 1,2-propylene oxide, 1,3-propylene oxide, etc. can be employed. Particularly preferred thickeners are the water-soluble, normally solid homopolymers of ethylene oxide, which polymers have molecular weight of at least 100,000. Such thickeners provide the necessary viscosity at quite low concentrations, e.g., 0.1 to 1.0% and provide generally superior results at any concentration, and at any viscosity level.

Wear-reducing additives for the oil phase are preferably employed in the emulsions according to the invention. Known wear-reducing additives for petroleum lubricating oils are generally suitable, but alkaline earth metal salts of dithiophosphoric acid esters and alkaline earth metal salts of sulfonic acids are preferred because of the remarkably good results they provide in combination with a thickener for the water phase.

Examples of other wear-reducing additives which can be employed in the oil phase include organic phosphate esters such as tricresyl phosphate, alkaline earth metal salts of dithiocarbamic acid esters, etc.

The compositions according to the present invention preferably contain the following components in the indicated ranges of proportions. Other proportions can be used, however; for example larger amounts, e.g., up to 10% or more, of the water thickener will frequently be needed in cases where some thickener other than a solid alkylene oxide polymer is used. The ranges in parentheses indicate more preferred compositions within the scope of the composition first stated.

| | |
|---|---|
| Petroleum lubricating oil | Not greater than 79 wt. percent (55 to 73.5%). |
| Water | Not less than 20% (25 to 43.5%). |
| Emulsifying agent | 1 to 10 wt. percent (1.4 to 4.0%). |
| Water thickener | 0 to 5.0% (0.1 to 1.0%). |
| Oil-soluble wear-reducing additive | Do. |

Either one or the other, or both, of the last two components is present in at least 0.01% concentration.

Water-in-oil emulsifying agents are generally suitable for use as the emulsifier in the above-specified composition. In its general aspect, the invention contemplates the use of any such emulsifier, although as subsequently specified, certain types of emulsifiers in certain combinations are much preferred because of the superior emulsion stability which they provide. Examples of water in oil emulsifiers which can be employed include alkaline earth metal sulfonates such as calcium sulfonates, barium sulfonates, etc.; alkaline earth metal salts of petroleum naphthenic acids or of alkyl substituted salicyclic acid or of fatty acids; partial esters of polyhydric alcohols with carboxylic acids such as naphthenic acids, fatty acids, etc.

Preferred emulsifying agents for use according to the invention comprise a mixture of a relatively hydrophobic partial ester of glycerol and a relatively hydrophilic polyalkoxylated partial ester of a polyhydric alcohol. It has been found that such mixtures provide superior emulsion stability to that obtainable with either component alone or with a single emulsifier having hydrophilic-hydrophobic balance intermediate between those of the components of the mixture.

The relatively hydrophobic ester which is employed according to this embodiment of the invention is a partial ester of glycerol. Examples of suitable esters are glycerol monooleate, glycerol monostearate, glycerol dipalmitate, glycerol monorosinate, glycerol mononaphthenate, etc. A preferred ester is glycerol monooleate.

The relatively hydrophilic ester which is employed according to this embodiment of the invention is a polyalkoxylated partial ester of a polyhydric alcohol, which ester has, prior to alkoxylation, 2 to 5 free hydroxyls per molecule. Examples of suitable esters for alkoxylation include glycerol monooleate, sorbitan monooleate, sorbitan sesquioleate, pentaerythritol monostearate, 1,5-pentanediol dipalmitate, mannitan trinaphthenate, sorbitan monorosinate, etc. The alkoxylation can be performed in any suitable known manner such as contacting the partial ester with an alkylene oxide, e.g., ethylene oxide, propylene oxide-1,2, etc., to react the alkynene oxide with hydroxyl structure in the partial ester. Preferably the number of moles of alkylene oxide reacted per mole of partial ester is within the approximate range from 4 to 24 in order to impart the desired hydrophilic character to the ester. The formation of relatively hydrophilic compounds by alkoxylation of partial esters of polyhydric alcohols is known in the art, and any suitable known procedure can be employed.

Examples of polyalkoxylated esters suitable for use according to the embodiment of the invention are polyoxyethylene sorbitan monolaurate, an oily liquid having viscosity of 350 to 550 cp. at 25° C., and specific gravity of 1.05 to 1.10 (Atlas Powder Company's "Tween 61"), polyoxyethylene sorbitan tristearate, a waxy solid having specific gravity of 1.03 to 1.08 (Atlas' "Tween 65"), polyoxyethylene sorbitan monooleate, an oily liquid having viscosity of 350 to 550 cp. at 25° C., and specific gravity of 1.00 to 1.05 (Atlas' "Tween 81"), polyoxyethylene sorbitan trioleate, an oily liquid having viscosity of 200 to 400 cp. at 25° C., and specific gravity of 1.00 to 1.05 (Atlas' "Tween 85"), polyoxyethylene propylene glycol monostearate, a semi-solid having specific gravity of 1.05 to 1.10 (Atlas' "G–2162"), etc.

Any suitable organic monocarboxylic acid can be employed in the preparation of the ester additives. Thus, the acid can be an aromatic, aliphatic, cycloaliphatic or heterocyclic carboxylic acid. Preferred acids are: the naturally occurring fatty acids, more preferably those having 12 to 30 carbon atoms per molecule, e.g., lauric, myristic, palmitic, oleic, stearic, erucic acids, etc.; petroleum naphthenic acids; rosin acids; and mixtures of carboxylic acids obtained by the partial oxidation of liquid phase of hydrocarbon mixtures such as petroleum fractions, as disclosed for example in L. W. Jones United States Patent No. 2,756,211, issued July 24, 1956, and the disclosures referred to in the specification of that patent. Other types of acids can be employed to make the ester additive, e.g., benzoic acid, furoic acid, etc. However, the acids previously mentioned are preferred. The acids preferably have 16 to 22 carbon atoms per molecule.

It is preferred according to the invention that both esters as above described be employed. Otherwise separation of excessive amounts of oil or "cream" from the emulsion tends to be obtained even under room temperature conditions. The separation of cream from an emulsion hydraulic fluid is a phenomenon wherein an upper layer of emulsion separates from the lower body of the emulsion. The upper emulsion, which is called "cream," is presumably lower in water content than the lower emulsion. The ratio of esters in the composition is preferably within the range from 0.1 to 10, more preferably 0.5 to 2.0, parts per weight of polyalkoxylated ester per part of glycerol ester.

The lubricating oil employed in the composition according to the invention preferably has Saybolt Universal viscosity within the approximate range from 50 to 500 seconds at 100° F., though other oils can be used in some instances. The oil may be obtained from any suitable type of crude petroleum, e.g., paraffinic, naphthenic, paraffinic-naphthenic crude, by conventional distillation and refining procedures.

Any suitable polyhydric alcohol having two or more hydroxyl groups per molecule, can be employed in the preparation of the polyalkoxylated ester additive according to the invention. Examples of suitable ester-forming polyhydric alcohols are glycols such as ethylene glycol, propylene glycol, butylene glycol, 1,5-pentanediol, 1,6-hexanediol, diethylene glycol, triethylene glycol and higher analogs; glycerols; pentaerythritol; sorbitol; sorbitan-1,4; mannitol; etc. Sorbitan-1,4 is preferred. For further disclosures of polyhydric alcohols, reference is made to R. E. Kirk et al., "Encyclopedia of Chemical Technology," volume 1 (1947), page 308, Tables II and III, and pages 321 to 333.

The salts of dithiophosphoric acid esters which are employed according to one embodiment of the invention constitute a known class of additives for lubricating oils. They are usually prepared by reacting an alcohol with $P_2S_5$ in order to obtain a dithiophosphoric acid ester, and reacting the latter with an alkaline earth metal compound in order to form a salt of the alkaline earth with the ester. Examples of suitable alkaline earths include zinc, barium and calcium, though other alkaline earths can also be employed as known in the art. Examples of suitable alcohols to be employed in the preparation of the dithiophosphoric acid ester include lauryl, octyl, cyclohexyl, amyl, butyl alcohols, etc., though other alcohols can be employed as recognized in the art.

In one embodiment, the invention involves the use of a hydrocarbon phase additive which comprises an alkaline earth metal salt of dithiophosphoric acid ester and an alkaline earth metal salt of alkyl benzene sulfonic acids, the latter providing beneficial effects with respect to emulsifying water in oil and also apparently with respect to improving the wear resisting qualities of the emulsion. Such sulfonates constitute a well known class of compounds, and the sulfonic acid employed to make such sulfonates can either be a single compound or a mixture obtained in the sulfonation of hydrocarbon mixtures, such as petroleum lubricating oil fractions. The sulfonic acids contain an average number of carbon atoms per molecule within the approximate range from 15 to 25. Particularly good sulfonic acids comprise the mahogany sulfonic acids having average molecular weight in the range from 450 to 500 obtained by sulfonation by known processes, of petroleum lubricating oil.

The following examples illustrate the invention.

*Example 1*

The following composition is prepared:

| | Percent |
|---|---|
| Mid-Continent distillate lubricating oil (100 SUS at 100° F.) | 57.6 |
| Glycerol monooleate (Emery Industries' "Emery 2221") | 1.2 |
| Polyoxyethylene sorbitan trioleate (Atlas' "Tween 85") | 1.2 |
| Ethylene oxide polymer (Carbide and Carbon's "WSR–205," melting point 65–7° C.) | 0.2 |
| Water | 39.8 |

The aqueous phase of the composition has kinematic viscosity at 100° F. of about 1.84 cs.

The composition has API gravity of about 20, Saybolt Universal viscosity at 100° F. of about 450 seconds, and pour point of about 0° F. It has good corrosion inhibiting properties, fire resistance and emulsion stability at normal and elevated temperatures.

The composition is subjected to testing for wear properties in the known Faville Le Vally "Falex" machine, the test pieces being immersed in the composition and subjected to a load of 500 p.s.i. for 3 hours. Each tooth of the ratchet wheel which is required to be taken up to maintain the load during that period represents 0.0000556 inch of journal and bearing wear, and total wear is obtained by multiplying that number by the number of teeth taken up on the ratchet wheel during the test. In this test, the above composition gives 0.0029 inch of wear. The same composition, but with the WSR–205 omitted, gives 0.0063 inch of wear.

This example shows the remarkable reduction in wear obtainable by the use of a quite small amount of ethylene oxide polymer.

*Example 2*

The following composition is prepared:

| | Percent |
|---|---|
| Mid-Continent distillate lubricating oil (100 SUS at 100° F.) | 55.2 |
| Glycerol monooleate (Emery Industries' "Emery 2221") | 1.2 |
| Polyoxyethylene sorbitan trioleate (Atlas' "Tween 85") | 1.2 |
| Mixture of zinc dioctyl dithiophosphate and barium sulfonates | 2.4 |
| Ethylene oxide polymer (Carbide and Carbon's "WSR–205") | 0.2 |
| Water | 39.8 |

The dithiophosphate-sulfonate mixture contains about 11.3 wt. percent barium, 1.8% zinc, 4.4% sulfur, and 2.2% phosphorus, and contains, by calculation, about 25% of the dithiophosphate component and 75% of the sulfonate component. The average molecular weight of the sulfonic acid groups in the barium sulfonates is about 425.

The emulsion composition has the following properties: API gravity at 60° F. of 20.6, Saybolt Universal viscosities at 75° F., 100° F., and 130° F. of 896.8, 470, and 259 seconds respectively, and pour point of 0° F. The composition passes the ASTM D665 corrosion test, and the hot manifold test set forth in Military Specification MIL-F-7100 "Fluid, Hydraulic, Non-Flammable, Aircraft."

The composition has good stability under normal storage conditions and does not separate any water at room temperature or at 100° F. over a two month period.

The composition is circulated through a Saginaw vane pump for a period of 48 hours at 150° F. and 200 p.s.i. The pump is then dismantled, and the pressure plate, rotor and ring are examined for signs of scoring or scratching. All are found to be free of scoring or scratching. The vanes are examined for loss of metal by wear, and the decrease in dimension indicates a loss of only 0.04% (average of two runs).

The composition is also subjected to the Falex wear test at 500 p.s.i. for 3 hours, and gives only 0.00055 inch of wear.

*Example 3*

A composition similar to that of Example 2 is prepared, omitting however the WSR-205. As compared with the Example 2 composition, the load carrying properties as measured by the Falex wear test and the Saginaw pump vane wear test are inferior:

| Composition | Wear in Falex Test, inches | Vane Wear, Percent |
| --- | --- | --- |
| Ethylene oxide polymer present | 0.00055 | 0.077 |
| Ethylene oxide polymer absent | 0.00075 | 0.129 |

The Falex wear data and Saginaw vane wear data obtained in the absence of the polymer are an average of results for two runs and four runs respectively.

This example shows the bneficial effect obtained by using ethylene oxide polymer as thickener for the water phase in an emulsion which also contains a load-carrying additive for the oil phase.

The ethylene oxid polymer is particularly effective in reducing wear when used in combination with alkaline earth metal dithiophosphoric acid esters and alkaline earth metal sulfonates.

*Example 4*

To compare zinc salts of dithiophosphoric acid esters with tricresyl phosphate as oil-phase wear-reducing additive, the following compositions are prepared:

| | Percent |
| --- | --- |
| Oil | 57.6 |
| Emery 2221 | 1.2 |
| Tween 85 | 1.2 |
| Zinc salt of dithiophosphoric acid ester | 0.6 |
| WSR-205 | 0.2 |
| Water | 39.2 | and

| | Percent |
| --- | --- |
| Oil | 57.6 |
| Emery 2221 | 1.2 |
| Tween 85 | 1.2 |
| Tricresyl phosphate | 0.6 |
| WSR-205 | 0.2 |
| Water | 39.2 |

The zinc salt contains 14.3 weight percent of sulfur, 7.7% phosphorus, and 8.2% zinc.

The Falex wear data obtained with these oils are as follows:

| | Inches |
| --- | --- |
| Oil containing zinc dithiophosphate | 0.000945 |
| Oil containing tricresyl phosphate | 0.00345 |

Other water-soluble thickeners can be employed in place of the ethylene oxide polymers of the preceding examples. A liquid copolymer of ethylene oxide and propylene oxide (EO:PO ratio about 3:1), the copolymer having Saybolt Universal viscosity at 100° F. of about 90,000, can be employed in the composition of Example 1, in place of the solid ethylene oxide polymer, and a reduction in wear obtained, as compared with an emulsion containing an unthickened water phase. However, the extent of reduction is less than that obtained with the solid ethylene oxide polymer.

In compositions such as that in Example 2, the use of solid ethylene oxide polymer is definitely preferred to that of a liquid polymer as above described, since the solid polymer provides an interaction with oil phase additives to produce uniquely reduced wear, and such interaction, in at least some systems, is not obtained with the liquid polymer. Various known mineral oil or water phase additives, which do not have an adverse effect on the properties of the composition, can be employed, in addition to the additives disclosed previously, in the composition according to the invention.

In one embodiment of the invention, a composition containing a relatively small amount of water is prepared originally for storage or transportation prior to the addition of more water to bring the water content to a desired level for use. Water contents of 5 to 15 volume percent can typically be used in such original preparations; other amounts can also be used in some cases. The total amount of thickener for the aqueous phase is preferably included in the original preparation, so that only water need be added later. In the compositions according to the invention, such original preparations containing the aqueous phase thickener and the reduced amount of water are generally compatible and stable in storage and transportation, and are readily mixed with additional water to form stable emulsions. A typical original preparation of this sort is one containing the same components as disclosed in Example 1, and the same number of parts by weight of each component, except that the number of parts of water is reduced from 39.8 to 3.98.

This application is a continuation-in-part of application Serial No. 783,142, filed December 29, 1958, and now abandoned.

The invention claimed is:

1. A new composition of matter suitable for use as lubricant and hydraulic fluid, consisting essentially of an emulsion of water in a petroleum lubricating oil, the amount of water being 25 to 43.5 weight percent based upon the emulsion, said water having dissolved therein 0.1 to 1.0%, based upon the emulsion, of an alkylene oxide polymer having average molecular weight of at least 100,000 selected from the group consisting of normally solid ethylene oxide and propylene oxide polymers, thereby to increase the viscosity of the aqueous phase to within the range from 1 to 10 cs. at 100° F.

2. Composition according to claim 1 and additionally comprising an alkaline earth metal salt of a dithiophosphoric acid ester dissolved in the oil phase.

3. Composition according to claim 2 and additionally comprising an alkaline earth metal salt of alkyl benzene sulfonic acids dissoloved in the oil phase.

4. Composition according to claim 1 wherein said lubricating oil has dissolved therein a mixture of a glycerol partial ester of a monocarboxylic acid containing 12 to 30 carbon atoms per molecule and the reaction product of 4 to 24 moles of an alkylene oxide selected from the group consisting of ethylene oxide and propylene oxide with a monocarboxylic acid ester of a polyhydric alcohol, the latter acid containing 12 to 30 carbon atoms per molecule.

5. A concentrate consisting essentially of an emulsion of water in a petroleum lubricatng oil and containing 5 to 15 volume percent of water based on concentrate, said water having dissolved therein an alkylene oxide polymer having average molecular weight of at least 100,000 selected from the group consisting of normally solid ethylene oxide and propylene oxide polymers, thereby to increase the viscosity of the aqueous phase to within the range from 1 to 10 cs. at 100° F., said concentrate being suitable for preparing the composition of claim 1 merely by addition of water.

6. Composition according to claim 5 wherein said lubricating oil has dissolved therein a mixture of a glycerol partial ester of a monocarboxylic acid containing 12 to 30 carbon atoms per molecule and the reaction product of 4 to 24 moles of an alkylene oxide selected from the group consisting of ethylene oxide and propylene oxide with a monocarboxylic acid ester of a polyhydric alcohol, the latter acid containing 12 to 30 carbon atoms per molecule.

References Cited in the file of this patent

UNITED STATES PATENTS

| | | |
|---|---|---|
| 2,825,693 | Beaubien et al. | Feb. 3, 1955 |
| 2,744,870 | Stillebroer et al. | May 8, 1956 |
| 2,820,007 | Van der Minne et al. | Jan. 14, 1958 |
| 2,907,714 | Francis et al. | Oct. 6, 1959 |
| 2,914,491 | Bailey | Nov. 24, 1959 |

FOREIGN PATENTS

| | | |
|---|---|---|
| 716,354 | Great Britain | Oct. 6, 1954 |

OTHER REFERENCES

"Carbowax Compounds and Polyethylene Glycols," Carbide and Carbon Chem. Corp., New York, N.Y. (1946), pp. 3–7.

Hill et al. and Bailey et al.: "High Molecular Weight Polymers of Ethylene Oxide," I. and E. Chem., vol. 5, No. 1, January 1958, pages 5–11.